(12) United States Patent
Wu et al.

(10) Patent No.: US 11,213,132 B1
(45) Date of Patent: Jan. 4, 2022

(54) STRUCTURE FOR RAPIDLY ASSEMBLING CHAIR BACK AND CHAIR SEAT

(71) Applicant: COMFORDY CO., LTD., Tainan (TW)

(72) Inventors: Yu-Ling Wu, Tainan (TW); Armin Roland Sander, Furth (DE); Cyrille Jehan Charier, Nuremberg (DE)

(73) Assignee: Comfordy Co., Ltd., Tainan (TW)

( * ) Notice: Subject to any disclaimer, the term of this patent is extended or adjusted under 35 U.S.C. 154(b) by 0 days.

(21) Appl. No.: 17/004,422

(22) Filed: Aug. 27, 2020

(51) Int. Cl.
*A47C 7/42* (2006.01)
*F16B 12/20* (2006.01)

(52) U.S. Cl.
CPC ............ *A47C 7/42* (2013.01); *F16B 12/2054* (2013.01)

(58) Field of Classification Search
CPC ..................................... A47C 4/02; A47C 7/42
See application file for complete search history.

(56) References Cited

U.S. PATENT DOCUMENTS

| 6,422,654 | B1 * | 7/2002 | Grove ....................... | A47C 7/42 297/440.1 |
| 2016/0353894 | A1 * | 12/2016 | Hsu .......................... | A47C 4/54 |
| 2019/0219083 | A1 * | 7/2019 | Selle ....................... | F16B 12/125 |

FOREIGN PATENT DOCUMENTS

| CN | 87208533 | U | * | 2/1988 | ............... A47C 7/42 |
| DE | 10312446 | B3 | * | 8/2004 | ............... A47C 7/42 |
| GB | 2072004 | A | * | 9/1981 | ............... A47C 4/02 |
| JP | 10272032 | A | * | 10/1998 | ............... A47C 7/42 |
| KR | 20100008021 | U | * | 8/2010 | |
| KR | 20110061818 | A | * | 6/2011 | |
| KR | 20120116141 | A | * | 10/2012 | ............... A47C 7/42 |
| WO | WO-2005053464 | A1 | * | 6/2005 | ............... A47C 7/42 |
| WO | WO-2015135632 | A1 | * | 9/2015 | ............ A47C 1/032 |

* cited by examiner

*Primary Examiner* — Timothy J Brindley
(74) *Attorney, Agent, or Firm* — Rosenberg, Klein & Lee

(57) ABSTRACT

The present invention discloses a structure for rapidly assembling a chair back and a chair seat. It comprises a chair seat underframe having a first engaging portion and an assembling channel and a chair back stand having a second engaging portion and an assembling block for correspondingly engaging with the assembling channel. The assembling channel has two protrusions at two lateral walls and the assembling block has two engaging grooves at two laterals for positioning and engaging with the two protrusions. The assembling channel of the chair seat underframe has an engaging hole, and a telescopic pin disposed at a bottom of the assembling block is positioned and engaged with the engaging hole. The assembling channel of the chair seat underframe and the assembling block of the chair back stand are further screwed together by a screwing member.

2 Claims, 6 Drawing Sheets

STRUCTURE FOR RAPIDLY ASSEMBLING CHAIR BACK AND CHAIR SEAT

BACKGROUND OF THE INVENTION

1. Field of the Invention

The present invention relates to a structure for rapidly assembling a chair back and a chair seat in a secure, easy and convenient manner, so as to prevent unexpected loosening or release of the chair back from the chair seat when a user is sitting on the chair.

2. Description of Related Art

To save cost for transportation and storage of a chair, a chair seat and a chair back of the chair are disassembled and stored separately and assembled again after transporting to a customer. Each of the chair back and the chair seat of the conventional chair mainly has an assembling member. For example, an improved structure of an office chair disclosed by the Taiwan Pat No. TW 412983(U) issued on 21 Nov. 2000, a structure of a base and a backrest for an office chair disclosed by the Taiwan Pat. No. TW 527888(U) issued on 11 Apr. 2003 and an assemble structure of a suspension frame for a chair back disclosed by the Taiwan Pat No. TW M360631(U) issued on 11 Jul. 2009 have assembling members in the chair back and the chair seat. The assembling member has plural locking holes to be inserted and fixed by plural locking members so as to screw and assemble the chair back to the chair seat.

However, the conventional chair that requires screwing the screws into the locking holes of the chair back and the chair seat one by one by a screw driver takes a lot of time to assemble the chair back and the chair seat. Furthermore, the screws screwed in the locking holes of the chair back and the chair seat are easily loosened after a period of time since the chair back is repeatedly lied and shaken by a user. Therefore, the chair back may be separated from the chair seat unexpectedly due to loosening of the screws which is dangerous to the user sits on the chair.

SUMMARY OF THE INVENTION

The present invention relates to a structure for rapidly assembling a chair back and a chair seat in a secure, easy and convenient manner, so as to prevent unexpected loosening or release of the chair back from the chair seat when a user is sitting on the chair.

The structure for rapidly assembling a chair back and a chair seat of the present invention is achieved by the following technical features.

The structure for rapidly assembling a chair back and a chair seat mainly comprises a chair seat underframe and a chair back stand. The chair seat underframe comprises a first engaging portion having an assembling channel, and the chair back stand comprises a second engaging portion having an assembling block for engaging with the assembling channel. The assembling channel comprises two protrusions respectively disposed on two corresponding lateral walls, and the assembling block of the chair back stand comprises two engaging grooves at two corresponding laterals thereof for positioning and engaging with the two protrusions of the assembling channel. In addition, at least one telescopic pin is disposed at a bottom of the chair back stand and is engaged with the assembling channel of the chair seat underframe by inserting into at least one engaging hole of the assembling channel. Furthermore, the assembling channel of the chair seat underframe and the assembling block of the chair back stand are assembled by screwing with a screwing member. Therefore, assembled stability of the chair back stand and the chair seat underframe and a safety for the user sitting on the chair are improved.

DETAILED DESCRIPTION OF THE PREFERRED EMBODIMENT

Figure 1:
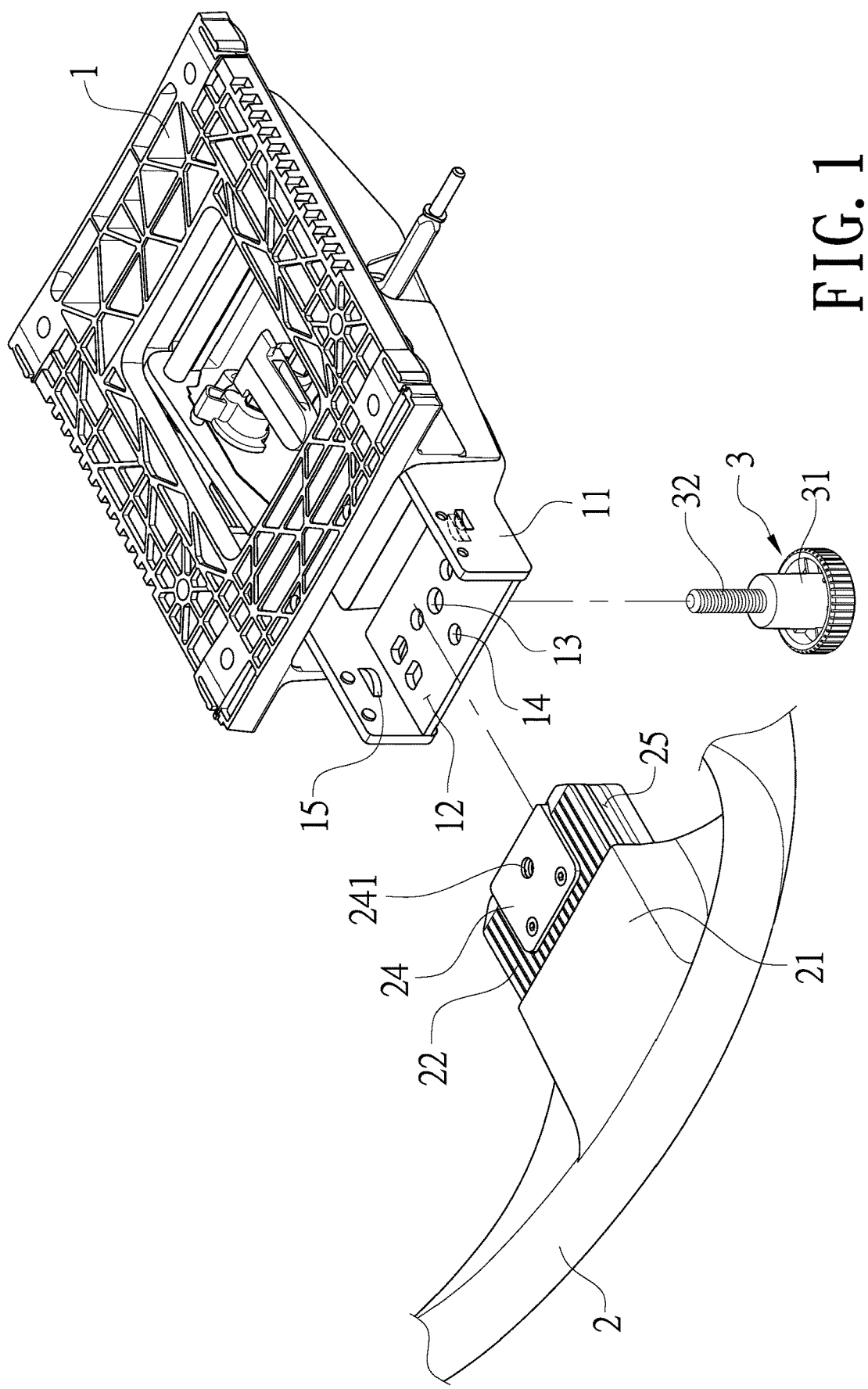
FIG. 1 is a first exploded diagram showing a structure for rapidly assembling a chair back and a chair seat of the present invention.
Figure 2:
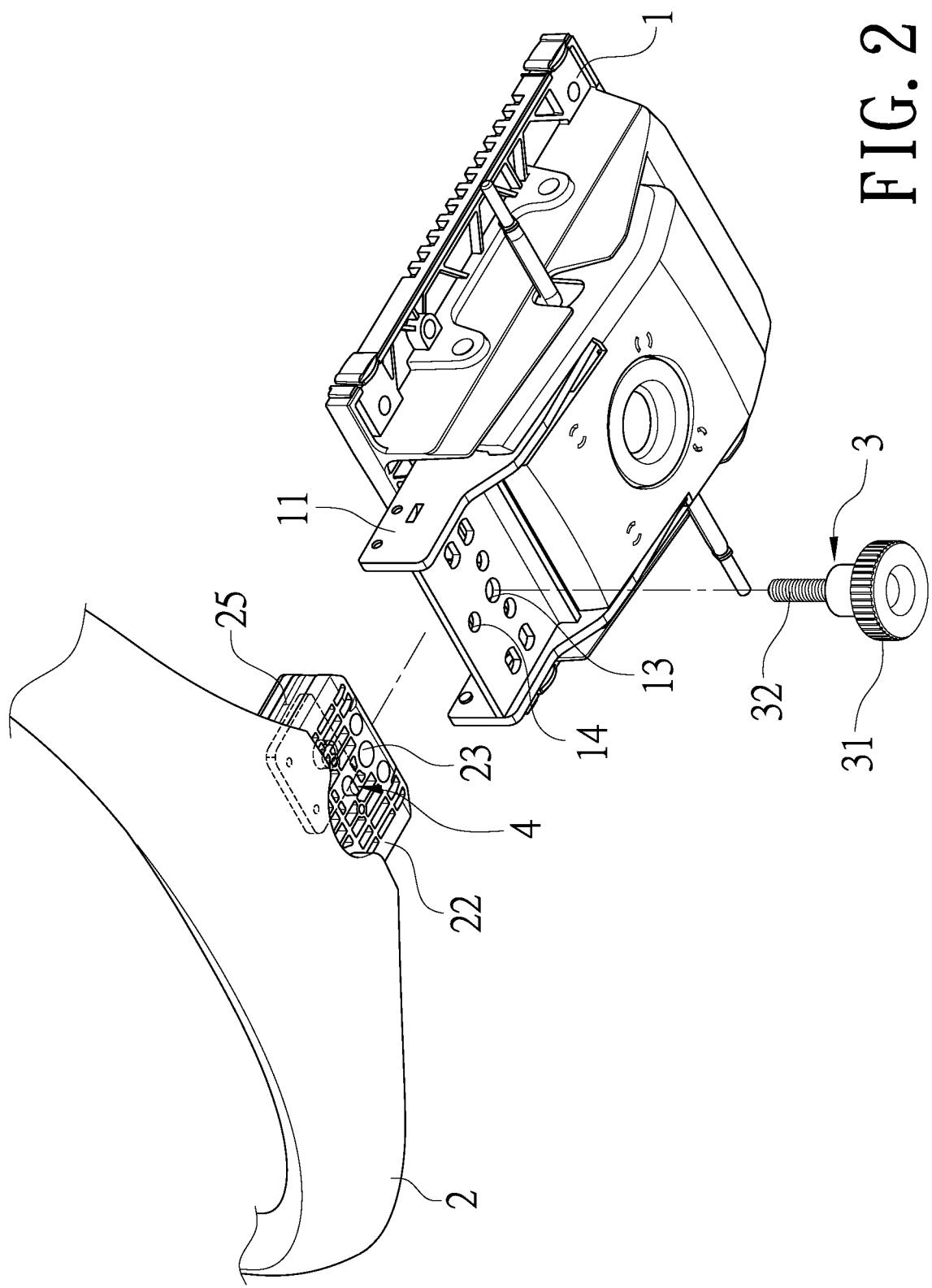
FIG. 2 is a second exploded diagram showing a structure for rapidly assembling a chair back and a chair seat of the present invention.
Figure 3:
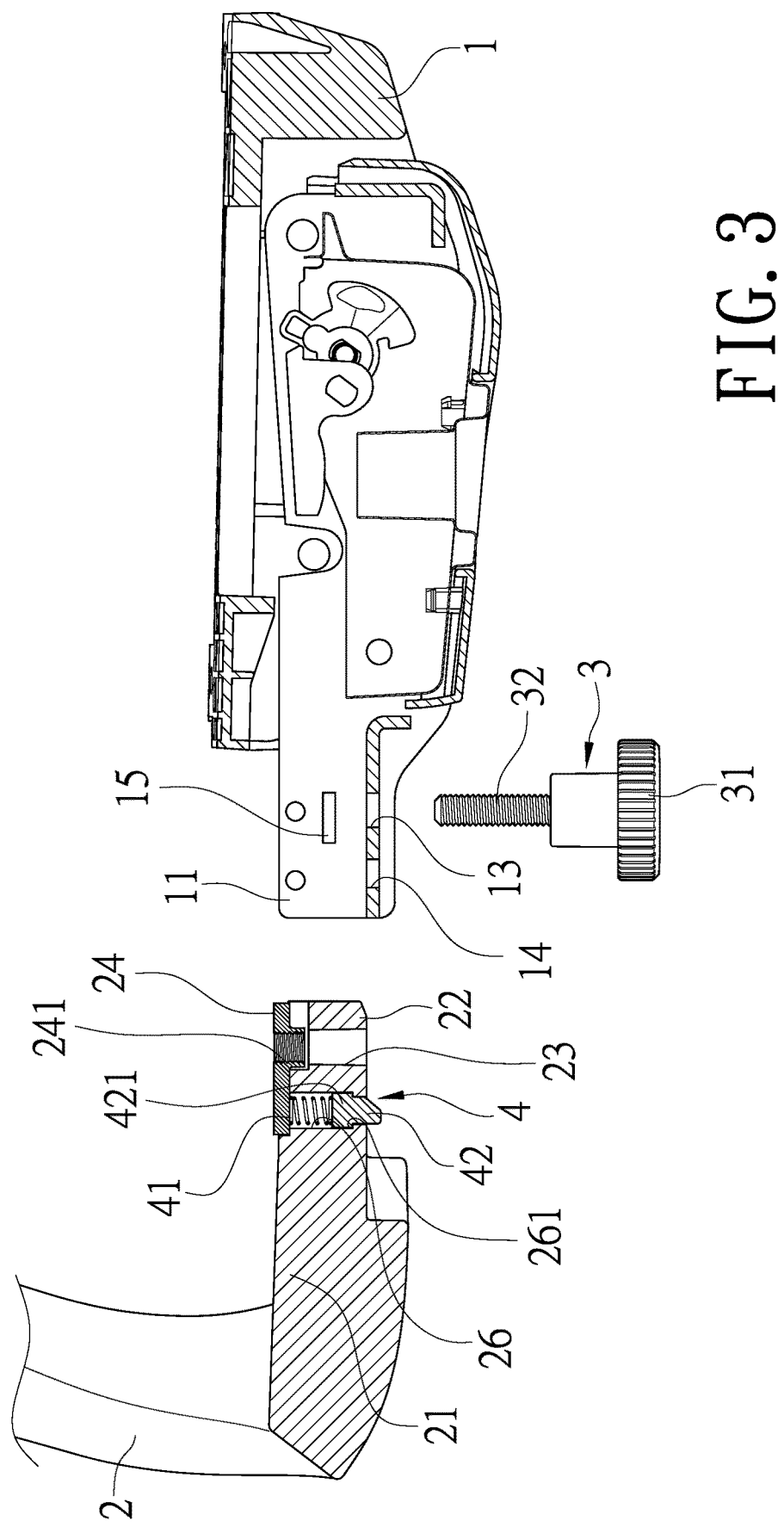
FIG. 3 is a sectional view showing a structure for rapidly assembling a chair back and a chair seat of the present invention in an exploded state.

Referring to FIG. 1 to FIG. 3, a structure for rapidly assembling a chair back and a chair seat of the present invention mainly comprises a chair seat underframe (1), a chair back stand (2), a screwing member (3) and at least one telescopic pin (4).

The chair seat underframe (1) comprises a first engaging portion (11) at a rear side thereof, a U-shaped assembling channel (12) in the first engaging portion (11), a second through hole (13) at a bottom of the assembling channel (12), at least one engaging hole (14) at the bottom of the assembling channel (12) neighboring to the second through hole (13), and two protrusions (15) respectively disposed on two corresponding lateral walls of the assembling channel (12).

The chair back stand (2) comprises a second engaging portion (21) at a bottom thereof, an assembling block (22) extended from the second engaging portion (21), a third through hole (23) penetrating from a bottom to a top of the assembling block (22), a metal fixing plate (24) disposed at the top of the assembling block (22), and two engaging grooves (25) disposed at two corresponding laterals of the assembling block (22). The fixing plate (24) has a locking hole (241) corresponding to the third through hole (23), and the locking hole (241) can be a screw hole. The two engaging grooves (25) at the two laterals of the assembling block (22) are guided by the two protrusions (15) on the two lateral walls of the assembling channel (12) of the chair seat underframe (1) for positioned and engaging with the two protrusions (15) so as to engage the assembling block (22) with the assembling channel (12). In addition, the third through hole (23) of the assembling block (22) corresponds to the second through hole (13) at the bottom of the assembling channel (12) as the assembling block (22) is engaged with the assembling channel (12). The assembling block (22) of the chair back stand (2) further comprises at least one first through hole (26) neighboring to the third through hole (23) in which the at least one first through hole penetrates from the bottom to the top of the assembling block (22) and covered by the fixing plate (24) at the top of the assembling block (22). The first through (26) has a stepped edge (261) at an inner wall thereof.

The screwing member (3) comprises a knob (31) and a locking rod (32) connected to the knob (31). The locking rod (32) is a screw rod. The locking rod (32) of the screwing member (3) pass through the second through hole (13) at the bottom of the assembling channel (12) of the chair seat underframe (1) and the third through hole (23) at the assembling block (22) of the chair back stand (2) for screwing and fixing to the locking hole (241) of the fixing plate (24) at the top of the assembling block (22).

The at least one telescopic pin (4) comprises a spring (41) and a pin rod (42), and the pin rod (42) has a stop edge (421) at an upper terminal. The spring (41) and the pin rod (42) of the telescopic pin (4) are accommodated in the first through hole (26), and the spring (41) is attached against the fixing plate (24) and a top of the pin rod (42) by two terminals for positioning. In addition, the stop edge (421) of the pin rod (42) is stopped and positioned by the stepped edge (261) of the first through hole (26). Furthermore, a bottom end of the pin rod (42) is protruded from the bottom of the assembling block (22), and inserted into and fastening to the engaging hole (14) at the bottom of the assembling channel (12) of the chair seat underframe (1).

Figure 4:
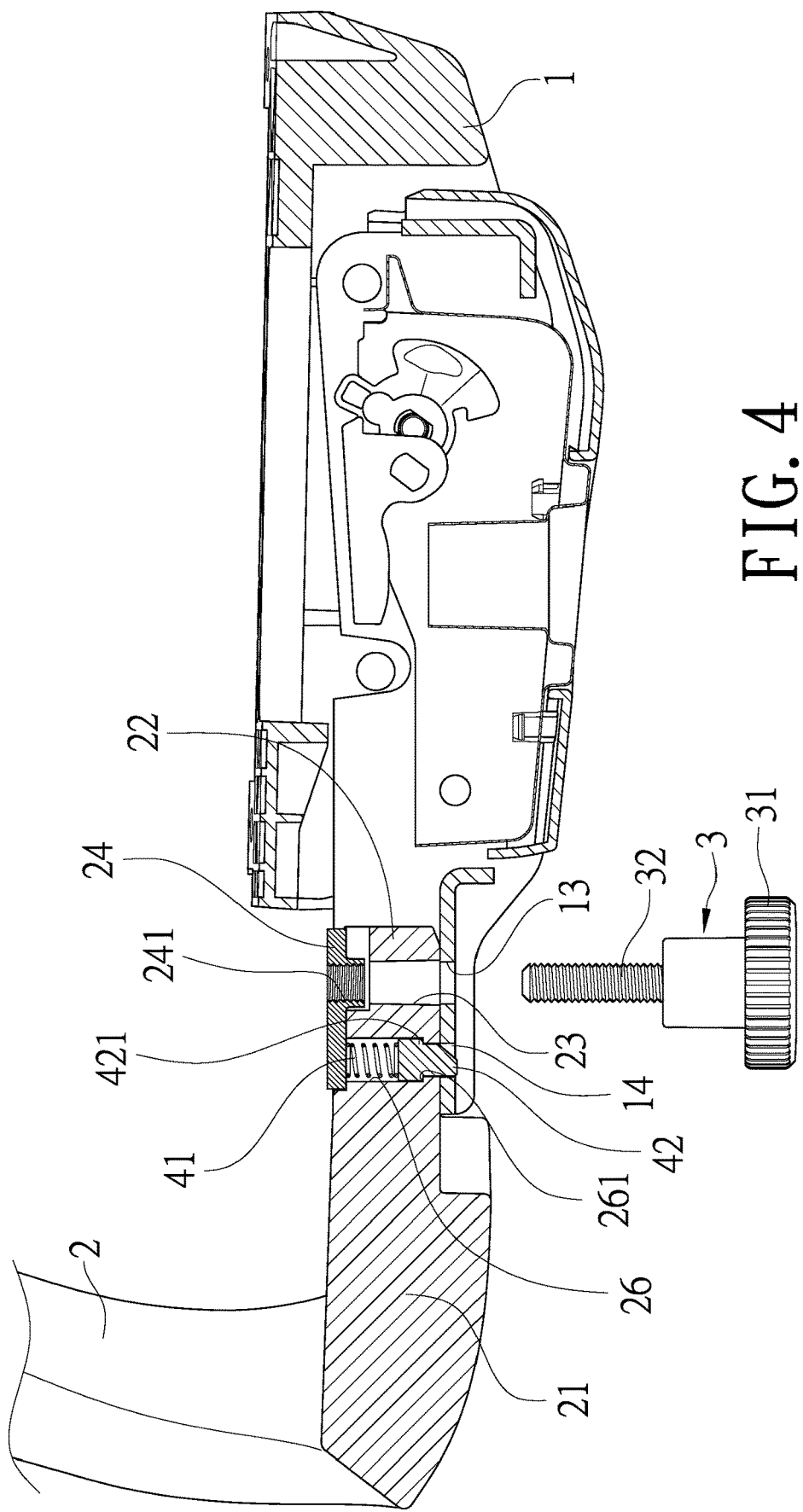
FIG. 4 is a first sectional diagram showing a structure for rapidly assembling a chair back and a chair seat of the present invention in assembly.

Please referring to FIG. 4, to assemble the chair back stand (2) with the chair seat underframe (1), the two engaging grooves (25) of the assembling block (22) are guided by the two protrusions (15) on the two lateral walls of the assembling channel (12) in the first engaging portion (11) of the chair seat underframe (1). The two engaging grooves (25) of the assembling block (22) are then positioned and engaged with the two protrusions (15) on the two lateral walls of the assembling channel (12) respectively.

As the assembling block (22) of the chair back stand (2) is engaged with the assembling channel (12) of the chair seat underframe (1), the pin rod (42) of the telescopic pin (4) disposed at the bottom of the assembling block (22) is moving alone the bottom of the assembling channel (12) and inserted into the engaging hole (14). When the pin rod (42) is moving along the bottom of the assembling channel (12), the pin rod (42) is pushed back into the telescopic pin (4) and attached against the bottom of the assemble channel (12) and the spring (41) of the telescopic pin (4) is compressed. When the pin rod (42) is moved to a position of the engaging hole (14), the compressed spring (41) is then re-extended and pushes the pin rod (42) to its original position, and the bottom end of the pin rod (42) is then inserted into the engaging hole (14) of the assembling channel (12) for positioning.

Figure 5:
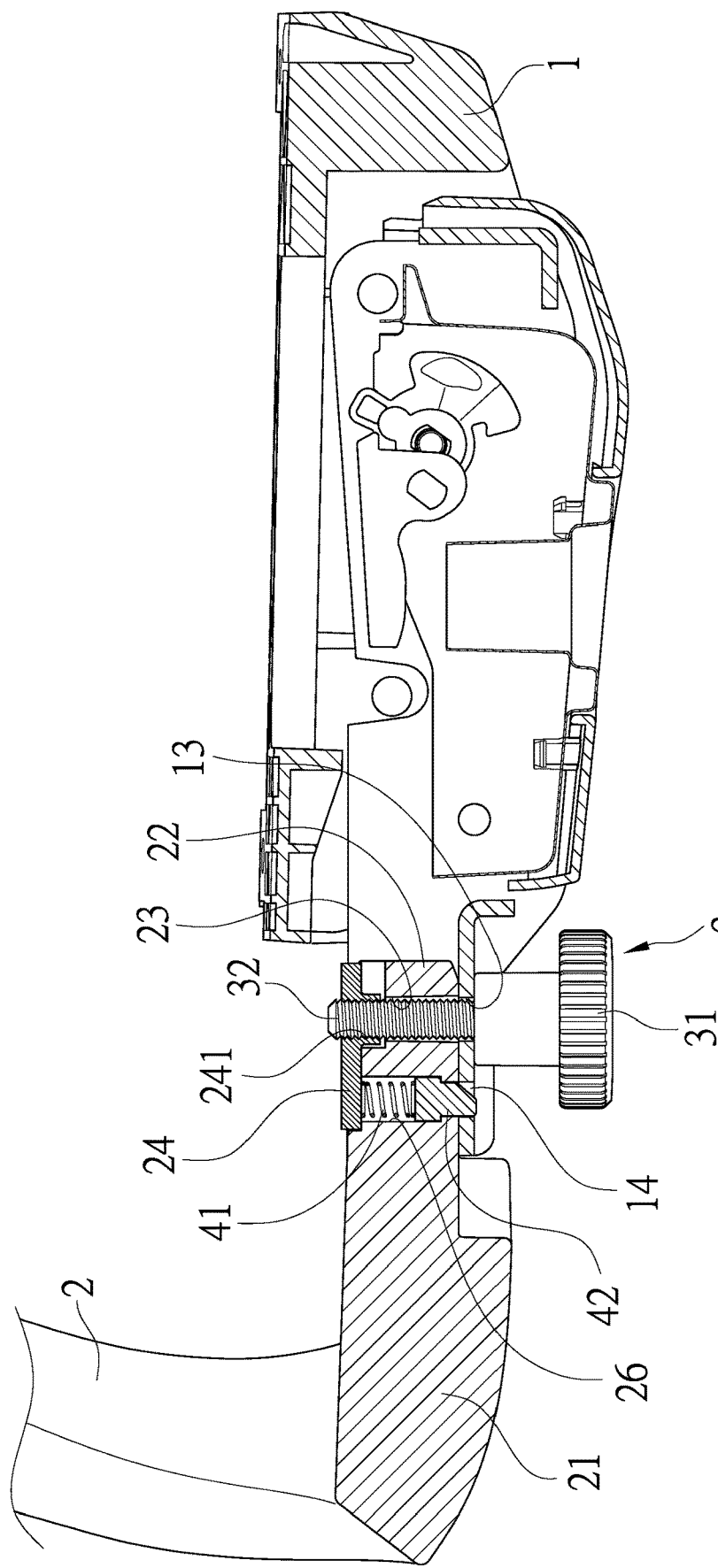
FIG. 5 is a second sectional diagram showing a structure for rapidly assembling a chair back and a chair seat of the present invention in assembly.
Figure 6:
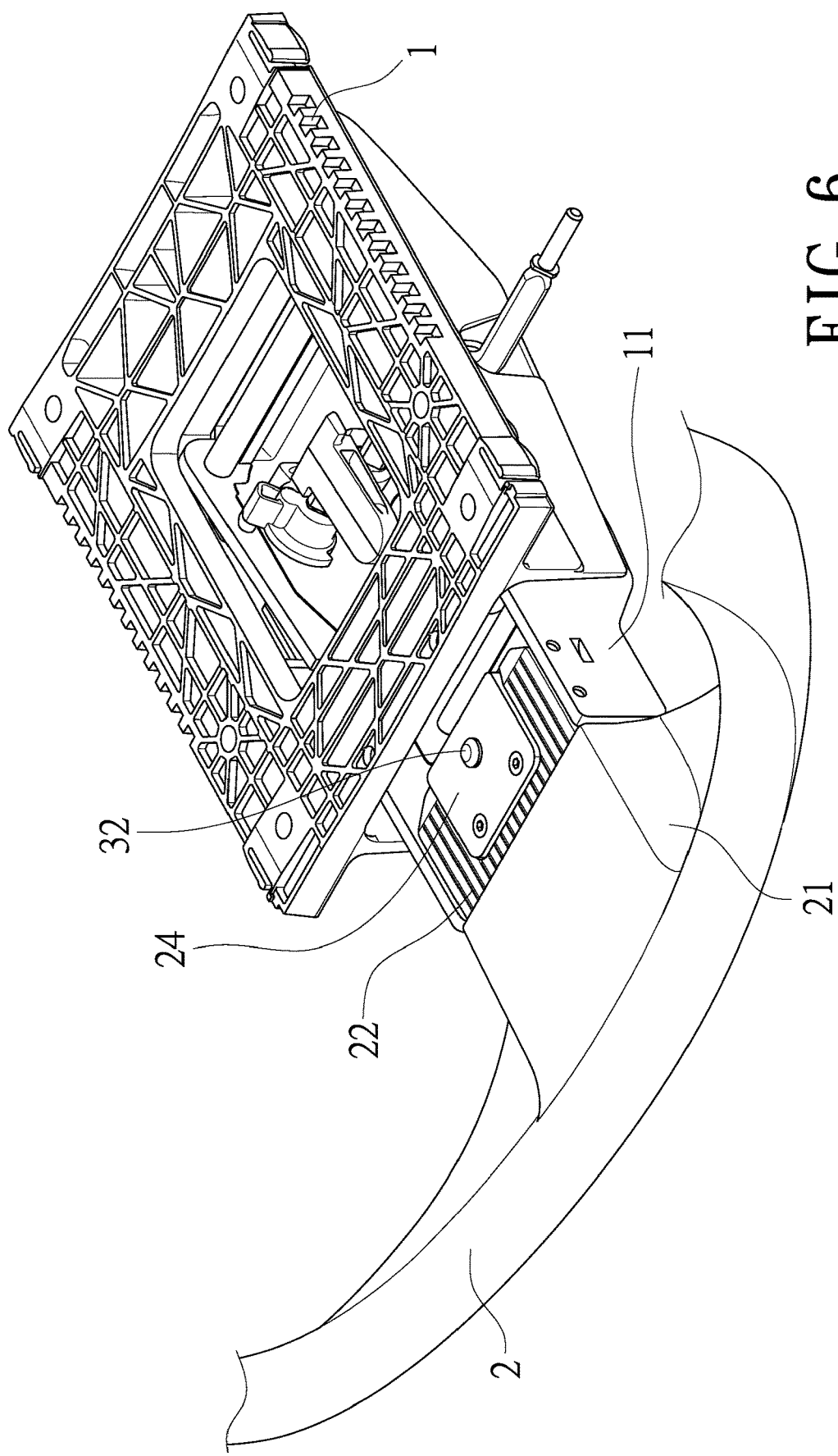
FIG. 6 is a stereogram showing a structure for rapidly assembling a chair back and a chair seat of the present invention in assembly.

Please referring to FIG. 5, as the telescopic pin (4) in the assembling block (22) of the chair back stand (2) is engaged with the engaging hole (14) at the assembling channel (12) of the chair seat underframe (1), a position of the third through hole (23) of the assembling block (22) corresponds to a position of the second through hole (13) at the bottom of the assembling (12) exactly. The locking rod (32) of the screwing member (3) is then penetrated through the chair seat underframe (1) and the chair back stand (2) from the second through hole (13) at the bottom of the assembling channel (12) to the third through hole (23) of the assembling block (22), and the locking rod (32) is screwed to the locking hole (241) of the fixing plate (24) at the top of the assembling block (22). Therefore, the chair seat underframe (1) and the chair back stand (2) are assembled conveniently as shown in FIG. 6.

Accordingly, the chair seat underframe (1) and the chair back stand (2) of the present invention are assembled by different ways including: (i) screwing the assembling channel (12) of the chair seat underframe (1) to the assembling block (22) of the chair back stand (2) by the screw rod (32) of the screwing member (3); (ii) engaging the two engaging grooves (25) at two laterals of the assembling block (22) of the chair back stand (2) with the two protrusions (15) of the assembling channel (12) of the chair seat underframe (1) for positioning; and (iii) engaging the telescopic pin (4) in the assembling block (22) of the chair back stand (2) with the engaging hole (14) at the assembling channel (12) of the chair seat underframe (1). Therefore, the assemble stability of the chair seat underframe (1) and the chair back stand (2) of the present invention is enhanced so as to prevent loosening or release of the chair back from the chair seat. So the present invention improves safety for the user sitting on the chair who is easily fallen from a conventional chair due to unexpected loosening of screws used to assemble the chair seat and the chair back of the conventional chair.

What is claimed is:

1. A structure for rapidly assembling a chair back and a chair seat, comprising:
    a chair seat underframe having a first engaging portion at a rear side thereof, an assembling channel in the first engaging portion, at least one engaging hole at a bottom of the assembling channel, and two protrusions respectively disposed on two corresponding lateral walls of the assembling channel;
    a chair back stand having a second engaging portion at a bottom thereof; an assembling block extended from the second engaging portion for engaging with the assembling channel in the first engaging portion, two engaging grooves disposed at two corresponding laterals of the assembling block for correspondingly positioning and engaging with the two protrusions in the assembling channel; and
    at least one telescopic pin disposed at a bottom of the assembling block,
    wherein the at least one telescopic pin has a spring and a pin rod correspondingly inserted into the engaging hole of the assembling channel and having a stop edge at an upper terminal and a bottom end protruded from the bottom of the assembling block, wherein the chair back stand has at least one first through hole penetrating from the bottom to a top of the assembling block for accommodating the spring and the pin rod and having a stepped edge at an inner wall thereof for stopping and positioning the stop edge of the pin rod, and a fixing plate disposed at the top of the assembling block for covering the at least one first through hole, and wherein the spring is attached against the fixing plate and a top of the pin rod by two terminals for positioning.

2. A structure for rapidly assembling a chair back and a chair seat, comprising:
    a chair seat underframe having a first engaging portion at a rear side thereof, an assembling channel in the first engaging portion, at least one engaging hole at a bottom of the assembling channel, and two protrusions respectively disposed on two corresponding lateral walls of the assembling channel;
    a chair back stand having a second engaging portion at a bottom thereof, an assembling block extended from the second engaging portion for engaging with the assembling channel in the first engaging portion, two engaging grooves disposed at two corresponding laterals of the assembling block for correspondingly positioning and engaging with the two protrusions in the assembling channel; and at least one telescopic pin disposed at a bottom of the assembling block for inserting into and fastening to the at least one engaging hole at the bottom of the assembling channel, wherein the assembling channel of the chair seat underframe has a second through hole at the bottom thereof, wherein the chair back stand has a third through hole penetrating from the bottom to a top of the assembling block and a fixing plate disposed at the top of the assembling block and having a locking hole corresponding to the third through hole, and wherein a screwing member is provided to pass through the second through hole at the assembling channel of the chair seat underframe and the third through hole at the assembling block of the chair back stand for fixing to the locking hole of the fixing plate.

* * * * *